United States Patent
Merritt et al.

(10) Patent No.: US 12,188,357 B2
(45) Date of Patent: Jan. 7, 2025

(54) TURBOMACHINERY SEAL PLATE WITH VARIABLE LATTICE DENSITIES

(71) Applicant: Hamilton Sundstrand Corporation, Charlotte, NC (US)

(72) Inventors: Brent J. Merritt, Southwick, MA (US); Craig M. Beers, Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/474,410

(22) Filed: Sep. 26, 2023

(65) Prior Publication Data
US 2024/0011406 A1    Jan. 11, 2024

Related U.S. Application Data

(63) Continuation of application No. 17/472,153, filed on Sep. 10, 2021, now Pat. No. 11,802,488.

(51) Int. Cl.
*F01D 25/28*    (2006.01)
*F01D 11/00*    (2006.01)

(52) U.S. Cl.
CPC .......... *F01D 11/005* (2013.01); *F01D 25/28* (2013.01); *F05D 2220/34* (2013.01); *F05D 2240/55* (2013.01); *F05D 2250/18* (2013.01); *F05D 2250/90* (2013.01); *F05D 2260/31* (2013.01)

(58) Field of Classification Search
CPC .... F01D 11/005; F01D 25/28; F05D 2220/34; F05D 2240/55; F05D 2250/18; F05D 2250/90; F05D 2260/31
See application file for complete search history.

(56) References Cited

U.S. PATENT DOCUMENTS

| | | | |
|---|---|---|---|
| 4,152,092 A | 5/1979 | Swearingen |
| 4,459,802 A | 7/1984 | Mowill |
| 4,820,128 A | 4/1989 | Ito |
| 4,834,693 A | 5/1989 | Profant et al. |
| 5,224,842 A | 7/1993 | Dziorny et al. |

(Continued)

FOREIGN PATENT DOCUMENTS

| DE | 202013010209 U1 | 2/2015 |
|---|---|---|
| EP | 2312171 A2 | 4/2011 |

(Continued)

OTHER PUBLICATIONS

Dong et al. Design and optimization of solid lattice hybrid structures fabricated by additive manufacturing, Elsevier Additive Manufacturing 33 (2020) 1011116, 1-12 (Year: 2020).

(Continued)

*Primary Examiner* — David E Sosnowski
*Assistant Examiner* — Theodore C Ribadeneyra
(74) *Attorney, Agent, or Firm* — Kinney & Lange, P.A.

(57) ABSTRACT

A seal plate for a rotary machine includes a hub centered on a central axis of the rotary machine, a disk portion extending radially outwards from the hub, and a variable lattice structure in an interior of the seal plate. The variable lattice structure includes a first region of the seal plate having a first lattice structure, and a second region of the seal plate having a second lattice structure. The second lattice structure of the second region is denser than the first lattice structure of the first region. The second region is a deflection region, a stress region, or an energy containment region of the seal plate.

8 Claims, 6 Drawing Sheets

(56) References Cited

U.S. PATENT DOCUMENTS

| | | | |
|---|---|---|---|
| 5,921,683 A | 7/1999 | Merritt et al. |
| 7,766,603 B2 | 8/2010 | Beckford et al. |
| 8,246,296 B2 | 8/2012 | Smith |
| 8,777,561 B2 | 7/2014 | Beers et al. |
| 9,181,959 B2 | 11/2015 | Rosen et al. |
| 9,611,784 B2 | 4/2017 | Beers et al. |
| 9,903,207 B2 | 2/2018 | Tozzi et al. |
| 10,036,258 B2 | 7/2018 | Mongillo et al. |
| 10,077,664 B2 | 9/2018 | Clum et al. |
| 10,132,327 B2 | 11/2018 | Beers et al. |
| 10,174,765 B2 | 1/2019 | Colson et al. |
| 10,221,694 B2 | 3/2019 | Snyder |
| 10,281,053 B2 | 5/2019 | Griffin et al. |
| 10,557,464 B2 | 2/2020 | Scancarello et al. |
| 10,633,976 B2 | 4/2020 | Nissen et al. |
| 10,634,143 B2 | 4/2020 | Scancarello et al. |
| 10,730,112 B2 | 8/2020 | Welch |
| 10,774,653 B2 | 9/2020 | Theertham |
| 10,830,249 B2 | 11/2020 | Pulnikov |
| 10,982,672 B2 | 4/2021 | Scancarello et al. |
| 11,015,482 B2 | 5/2021 | Kasal et al. |
| 11,047,387 B2 | 6/2021 | Wu et al. |
| 11,168,568 B2 | 11/2021 | Theertham |
| 11,187,149 B2 | 11/2021 | Kobielski et al. |
| 11,248,595 B2 | 2/2022 | Scancarello et al. |
| 2003/0005705 A1 | 1/2003 | Chan et al. |
| 2006/0062665 A1 | 3/2006 | McAuliffe et al. |
| 2006/0104816 A1 | 5/2006 | Kraemer et al. |
| 2010/0215506 A1 | 8/2010 | Heyes et al. |
| 2012/0064815 A1 | 3/2012 | Beers et al. |
| 2012/0156043 A1 | 6/2012 | Colson et al. |
| 2014/0026993 A1 | 1/2014 | Rosen et al. |
| 2014/0030070 A1 | 1/2014 | Beers et al. |
| 2014/0044531 A1 | 2/2014 | Rosen et al. |
| 2014/0112774 A1 | 4/2014 | Freeman et al. |
| 2014/0186161 A1 | 7/2014 | Colson et al. |
| 2014/0301830 A1 | 10/2014 | Beers et al. |
| 2015/0098805 A1 | 4/2015 | Beers et al. |
| 2015/0285296 A1 | 10/2015 | Simon et al. |
| 2015/0345396 A1 | 12/2015 | Zelesky et al. |
| 2016/0001351 A1 | 1/2016 | Gunther et al. |
| 2016/0177765 A1 | 6/2016 | Lemoine et al. |
| 2016/0186589 A1 | 6/2016 | Budnick et al. |
| 2016/0356167 A1 | 12/2016 | Beers et al. |
| 2017/0002826 A1 | 1/2017 | Byon |
| 2017/0009595 A1 | 1/2017 | Mccaffrey |
| 2017/0159447 A1 | 6/2017 | Clum et al. |
| 2017/0182561 A1 | 6/2017 | Scancarello et al. |
| 2017/0184086 A1 | 6/2017 | Scancarello et al. |
| 2017/0184108 A1 | 6/2017 | Scancarello et al. |
| 2017/0204873 A1 | 7/2017 | Beers et al. |
| 2018/0038385 A1 | 2/2018 | Welch |
| 2018/0209276 A1 | 7/2018 | Tozzi et al. |
| 2019/0010827 A1 | 1/2019 | Mohammed et al. |
| 2019/0024517 A1 | 1/2019 | Takeda et al. |
| 2019/0032491 A1 | 1/2019 | Nissen et al. |
| 2019/0070664 A1 | 3/2019 | Paniogue et al. |
| 2019/0178085 A1 | 6/2019 | Ripolles Perez |
| 2019/0178166 A1 | 6/2019 | Miller et al. |
| 2019/0234313 A1 | 8/2019 | Kray et al. |
| 2020/0040734 A1 | 2/2020 | Cox |
| 2020/0141399 A1 | 5/2020 | Scancarello et al. |
| 2020/0157968 A1 | 5/2020 | Braun et al. |
| 2020/0165936 A1 | 5/2020 | Kasal et al. |
| 2020/0182066 A1 | 6/2020 | Theertham |
| 2020/0217206 A1 | 7/2020 | Nissen et al. |
| 2020/0217321 A1 | 7/2020 | Scancarello et al. |
| 2020/0269364 A1 | 8/2020 | Beers et al. |
| 2020/0340488 A1 | 10/2020 | Kobielski et al. |
| 2021/0003016 A1 | 1/2021 | Theertham |
| 2021/0025324 A1 | 1/2021 | Morris et al. |
| 2021/0025325 A1 | 1/2021 | Kobielski et al. |
| 2021/0025405 A1 | 1/2021 | Kobielski et al. |
| 2021/0156304 A1 | 5/2021 | Kobielski et al. |
| 2021/0222588 A1 | 7/2021 | Kasal et al. |
| 2021/0396179 A1 | 12/2021 | Balandier |
| 2022/0099110 A1 | 3/2022 | Carr et al. |
| 2022/0275809 A1 | 9/2022 | Kobielski et al. |
| 2022/0349416 A1 | 11/2022 | Gaye et al. |

FOREIGN PATENT DOCUMENTS

| | | |
|---|---|---|
| EP | 3721093 B1 | 8/2021 |
| FR | 2958353 A1 | 10/2011 |
| JP | 2016037901 A | 3/2016 |
| JP | 2017112764 A | 6/2017 |
| JP | 2019138443 A | 8/2019 |
| JP | 2019138444 A | 8/2019 |
| JP | 2021057980 A | 4/2021 |
| NO | 134668 B | 8/1976 |
| WO | 2019110909 A1 | 6/2019 |

OTHER PUBLICATIONS

Tang et al. Bidirectional Evolutionary Structural Optimization (BESO) based design method for lattice structure to be fabricated by additive manufacturing, Elsevier Computer-Aided Design 69 (2015) 91-101 (Year: 2015).

Wang et al. Multi-scale design and optimization for solid-lattice hybrid structures and their application to aerospace vehicle components, Chinese Journal of Aeronautics, 92021, 34(5): 386-398 (Year: 2021).

Zhang et al. Optimization design of variable density lattice structure for additive manufacturing, Elsevier Energy 242 (2022) 122554, 1-10 (Year: 2022).

Aboulkhair, Nesma T., et al., "3D Printing of Aluminum alloys: Additive Manufacturing of Aluminum alloys using selective laser melting", Progress in Materials Science 106, 2019, 45 pages.

Fairclough, Caty, "Advancing Additive Manufacturing with Sequential Simulations", Mar. 7, 2018, 12 pages.

Stapleton, Thomas J., et al., "Additive Manufacturing Technology to Enhance Environmental Control Life Support (ECLS) Equipment Performance While Reducing Its Weight and Volume", 45th International Conference on Environmental Systems, Jul. 12-16, 2015, 7 pages.

Extended European Search Report for European Patent Application No. 22194964.7, dated Jan. 30, 2023, 8 pages.

Extended European Search Report for European Patent Application No. 22193978.8, dated Jan. 30, 2023, 7 pages.

Extended European Search Report for European Patent Application No. 22195468.8, dated Feb. 10, 2023, 6 pages.

Extended European Search Report for European Patent Application No. 22194843.3, dated Feb. 2, 2023, 7 pages.

Extended European Search Report for European Patent Application No. 22194929.0, dated Jan. 23, 2023, 7 pages.

TURBOMACHINERY SEAL PLATE WITH VARIABLE LATTICE DENSITIES

BACKGROUND

The present disclosure relates to aircraft environmental control systems, and in particular, to a turbomachinery seal plate for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the air cycle machine before the air is delivered to the aircraft cabin.

Air cycle machines typically include rotating components mounted to a tie rod and a static housing surrounding the rotating components. The static housing can include multiple pieces that are fastened together. A seal plate can be positioned between the static housing pieces to limit the leakage of air between differently pressurized regions of the air cycle machine.

SUMMARY

A seal plate for a rotary machine includes a hub centered on a central axis of the rotary machine, a disk portion extending radially outwards from the hub, and a variable lattice structure in an interior of the seal plate. The variable lattice structure includes a first region of the seal plate having a first lattice structure, and a second region of the seal plate having a second lattice structure. The second lattice structure of the second region is denser than the first lattice structure of the first region. The second region is a deflection region, a stress region, or an energy containment region of the seal plate.

A rotary machine includes a tie rod extending through the rotary machine along a central axis, a compressor rotor mounted on the tie rod, a turbine rotor mounted on the tie rod, a compressor housing surrounding the compressor rotor, and a turbine housing surrounding the turbine rotor. A seal plate is positioned between the compressor housing and the turbine housing. The seal plates includes a hub centered on the central axis of the rotary machine, a disk portion extending radially outwards from the hub, and a variable lattice structure in an interior of the seal plate. The variable lattice structure includes a first region of the seal plate having a first lattice structure, and a second region of the seal plate having a second lattice structure. The second lattice structure of the second region is denser than the first lattice structure of the first region. The second region is a deflection region, a stress region, or an energy containment region of the seal plate.

DETAILED DESCRIPTION

Figure 1:
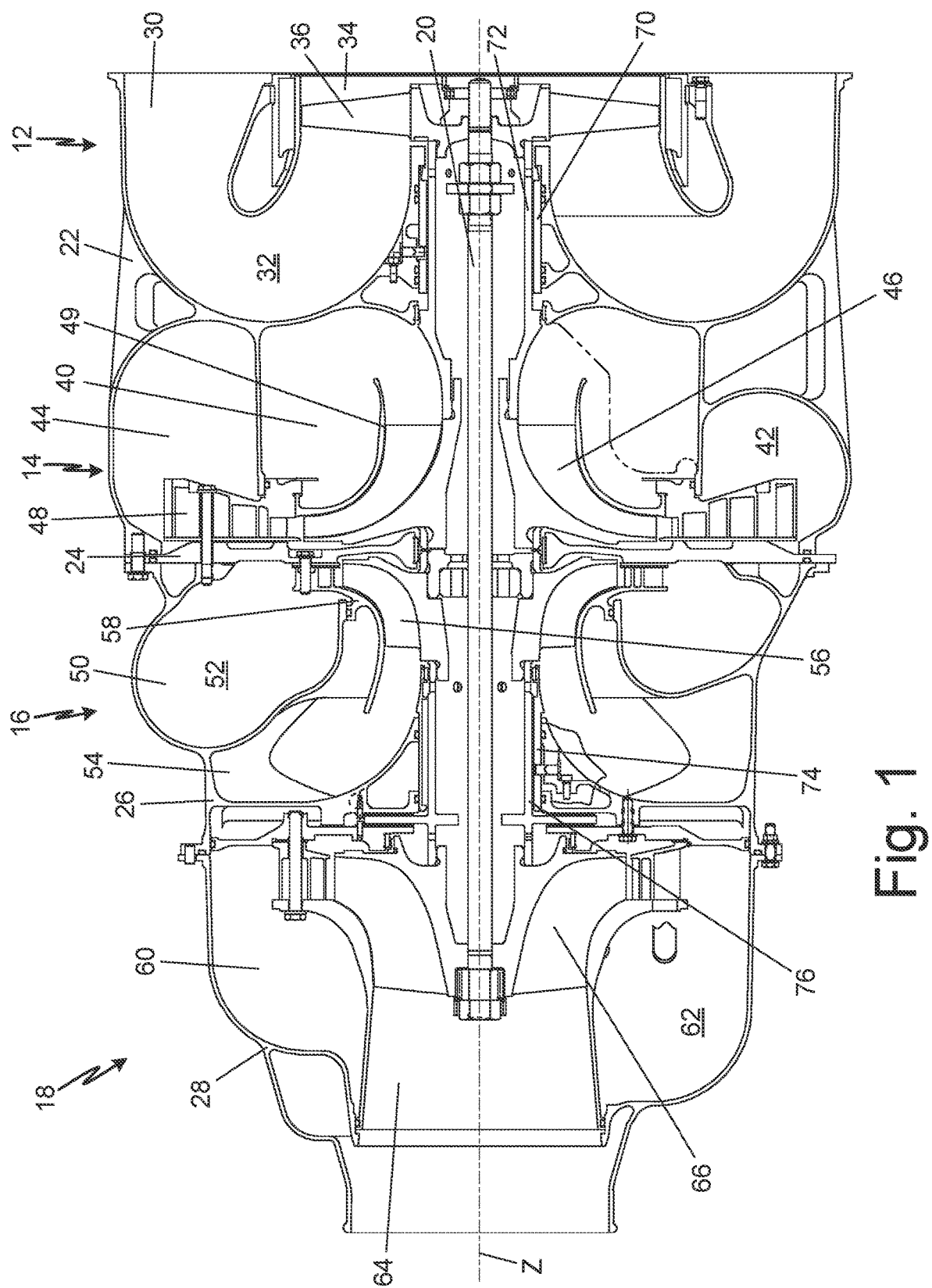
FIG. 1 is a cross-sectional view of an air cycle machine.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Fan section 12 includes fan inlet 30, fan duct 32, fan outlet 34, and fan rotor 36. Compressor section 14 includes compressor inlet 40, compressor duct 42, compressor outlet 44, compressor rotor 46, diffuser 48, and compressor rotor shroud 49. First turbine section 16 includes first turbine inlet 50, first turbine duct 52, first turbine outlet 54, first turbine rotor 56, and first turbine rotor shroud 58. Second turbine section 18 includes second turbine inlet 60, second turbine duct 62, second turbine outlet 64, and second turbine rotor 66. Air cycle machine 10 further includes first journal bearing 70, first rotating shaft 72, second journal bearing 74, and second rotating shaft 76. Also shown in FIG. 1 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 housing first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan outlet 34 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44. Compressor rotor shroud 49 is positioned radially outward from and surrounds compressor rotor 46.

First turbine section 16 includes first turbine inlet 50, first turbine duct 52, first turbine outlet 54, first turbine rotor 56, and first turbine rotor shroud 58. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20. First turbine rotor shroud 58 is positioned radially outward from and surrounds first turbine rotor 56.

Second turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Figure 2A:
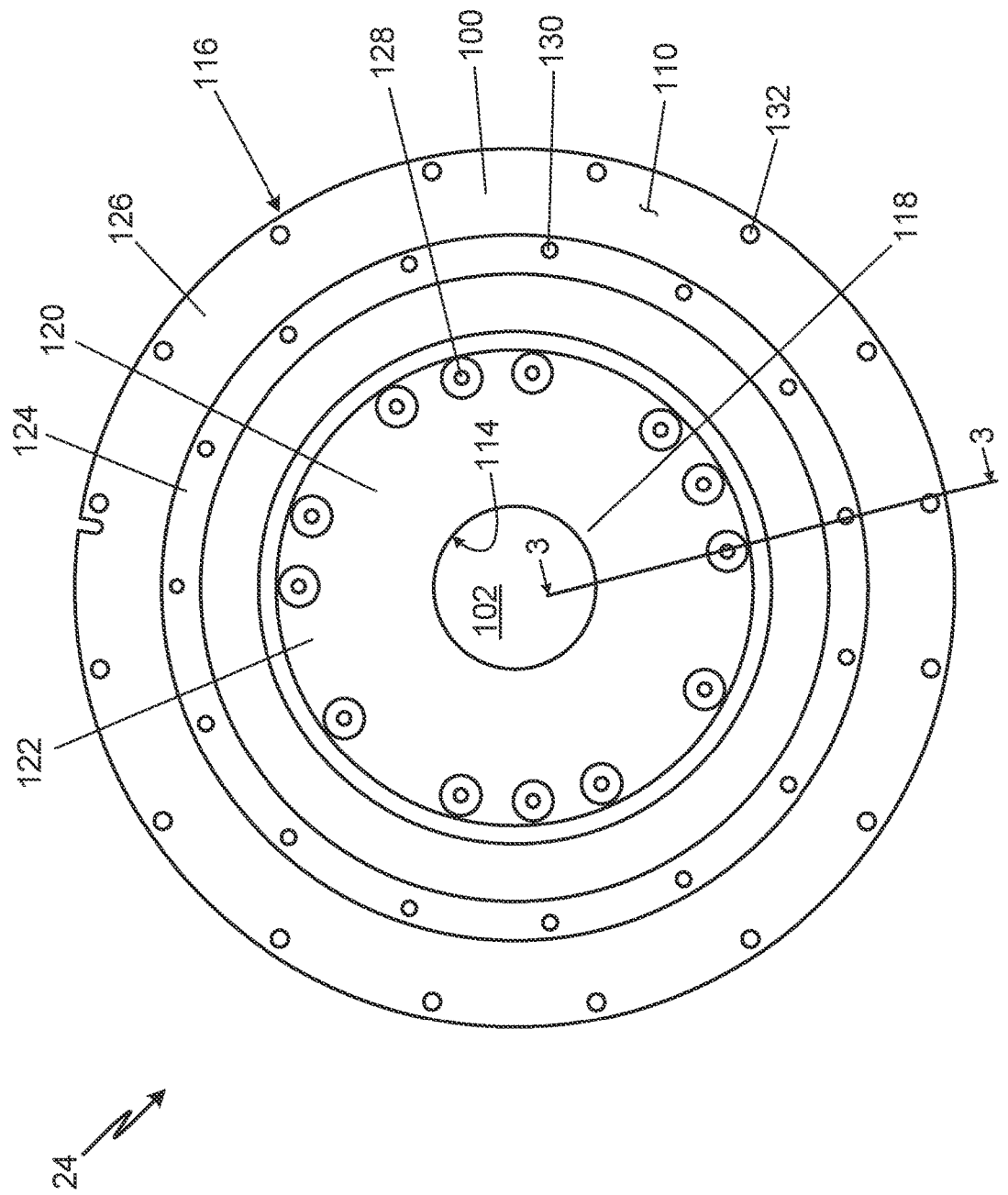
FIG. 2A is a front plan view of a seal plate of the air cycle machine.
Figure 2B:
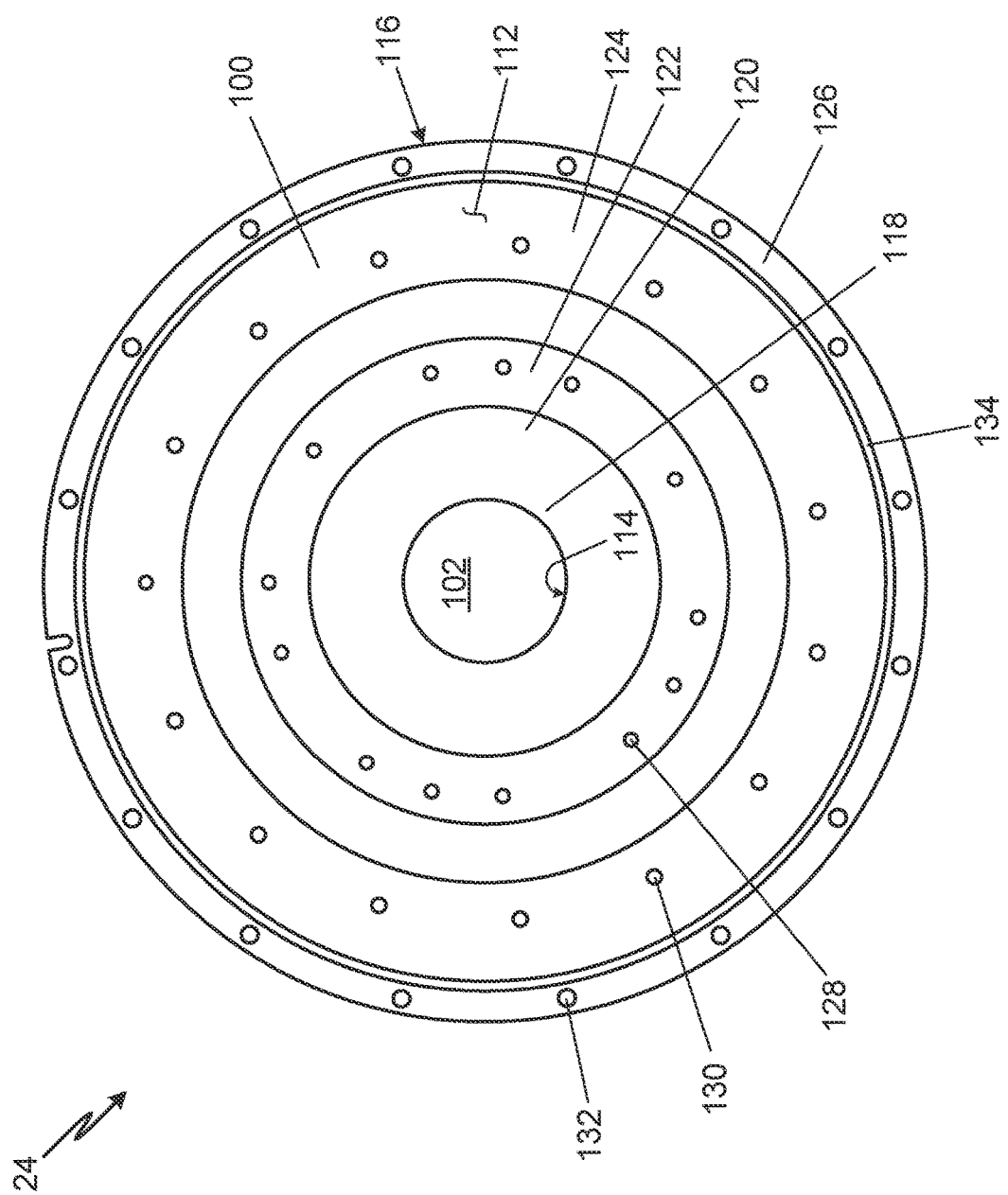
FIG. 2B is a back plan view of the seal plate of the air cycle machine.
Figure 3:
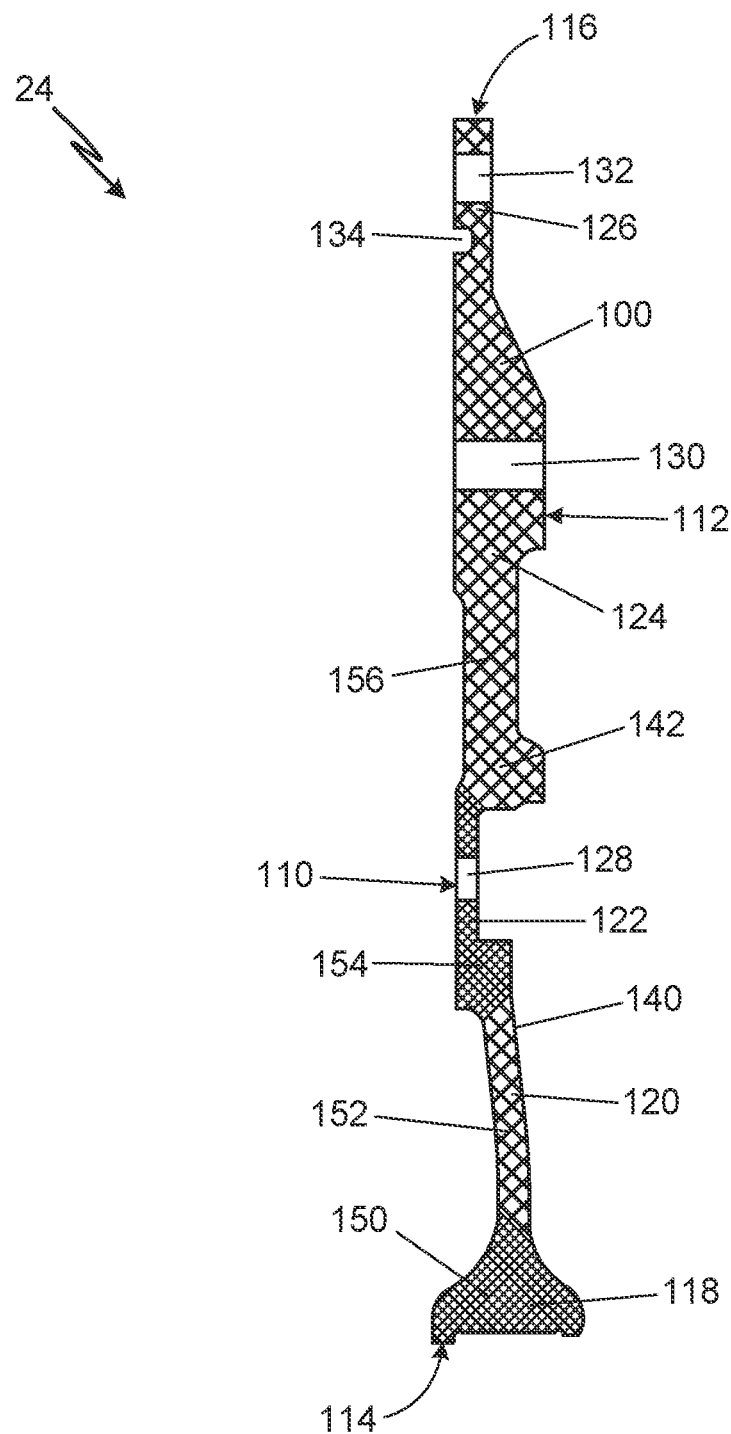
FIG. 3 is a cross-sectional view of a portion of the seal plate taken along line 3-3 of FIG. 2A.

FIG. 2A is a front plan view of seal plate 24 of air cycle machine 10. FIG. 2B is a back plan view of seal plate 24 of air cycle machine 10. FIG. 3 is a cross-sectional view of a portion of seal plate 24 taken along line 3-3 of FIG. 2A. Seal plate 24 includes body 100 and bore 102 (shown in FIGS. 2A-2B). Body 100 includes first side 110, second side 112, radially inner end 114, radially outer end 116, hub 118, first disk portion 120, second disk portion 122, third disk portion 124, fourth disk portion 126, first plurality of holes 128, second plurality of holes 130, third plurality of holes 132, and groove 134 (shown in FIGS. 2B-3). As shown in FIG. 3, body 100 further includes exterior surface 140 and lattice structure 142, which includes first region 150, second region 152, third region 154, and fourth region 156.

Seal plate 24 includes body 100 with bore 102 extending through a center of body 100. Body 100 has a plate shape and includes first side 110 and second side 112 opposite of first side 110. Body 100 also has radially inner end 114 and radially outer end 116 opposite of radially inner end 114. Radially inner end 114 of body 100 defines bore 102 extending through body 100 of seal plate 24.

Body 100 includes hub 118 extending from radially inner end 114 and positioned adjacent to bore 102. Hub 118 is a center portion of body 100. First disk portion 120 of body 100 extends radially outward from hub 118. Second disk portion 122 of body 100 extends radially outward from first disk portion 120. Third disk portion 124 of body 100 extends radially outward from second disk portion 122. Fourth disk portion 126 of body 100 extends radially outward from third disk portion 124 to radially outer end 116. First plurality of holes 128 are positioned around and extend through second disk portion 122 of body 100. Second plurality of holes 130 are positioned around and extend through third disk portion 124 of body 100. Third plurality of holes 132 are positioned around and extend through fourth disk portion 126 of body 100. Groove 134 is positioned on fourth disk portion 126 of body 100 and extends into body 100 from second side 112 of body 100. Groove 134 is configured to receive an o-ring to seal against other components of air cycle machine 10.

Body 100 further includes exterior surface 140 that surrounds lattice structure 142 in an interior of body 100. Exterior surface 140 is a solid, continuous surface. Lattice structure 142 is a varying lattice structure. Lattice structure 142 has regions with varying densities. As shown in FIG. 3, lattice structure 142 has first region 150, second region 152, third region 154 and fourth region 156. Lattice structure 142 may vary gradually or abruptly between regions. Lattice structure 142 includes members arranged in a 3D crisscrossing pattern with voids between the members. As shown in FIG. 3, lattice structure 142 varies in density by having a varying distribution of the members and voids of lattice structure 142. In alternate embodiments, lattice structure 142 can vary in density by varying the thickness of the members, by having varying geometrical configurations, and/or by varying fillet radii on joints between the members.

First region 150 is a region of lattice structure 142 positioned in hub 118 of body 100. Second region 152 is a region of lattice structure 142 in first disk portion 120 of body 100. Third region 154 is a region of lattice structure 142 in second disk portion 122 of body 100 that surrounds first plurality of bolt holes 128. Fourth region 156 is a region of lattice structure 142 in third disk portion 124 and fourth disk portion 126 of body 100.

In the embodiment shown in FIG. 3, first region 150 and third region 154 of lattice structure 142 have a greater density than second region 152 and fourth region 156 of lattice structure 142. Seal plate 24 is additively manufactured, allowing lattice structure 142 to be manufactured with different densities in different areas of seal plate 24. Any suitable additive manufacturing process (also known as a 3D printing process) can be used to manufacture seal plate 24, including, for example, direct metal laser sintering, electron beam freeform fabrication, electron-beam melting, selective laser melting, or selective laser sintering. Seal plate 24 can be made out of any material that can be used in an additive manufacturing process, includes any of stainless steel, corrosion-resistant steel, nickel-chromium alloy, aluminum, titanium, synthetic fiber, fiberglass, composites, carbon fiber, thermosetting bismaleimide (BMI) resins, and combinations thereof.

Traditional seal plates for rotary machines have solid cross-sections and can be manufactured by subtractive manufacturing processes, such as hogout, or compression molding. Additively manufacturing seal plate 24 allows lattice structure 142 to be used in seal plate 24. Using lattice structure 142 in seal plate 24 allows seal plate 24 to have a reduced weight compared to traditional seal plates, as there are voids between lattice structure 142. At the same time, seal plate 24 will have an equivalent strength as traditional seal plates due to the increased strength of lattice structure 142.

Lattice structure 142 in seal plate 24 can also improve the thermal resistance of seal plate 24. Seal plate 24 is used as a heat transfer barrier between components of air cycle machine 10. Manufacturing seal plate 24 with lattice structure 142 improves the thermal resistance of seal plate 24, as there are voids in lattice structure 142 that improve the insulating abilities of seal plate 24.

Further, the density of lattice structure 142 is varied to optimize mechanical properties of seal plate 24 locally and generally. Mechanical properties of seal plate 24, such as stress, strain, stiffness, and energy absorption, can be optimized to improve the performance of seal plate 24 by reducing stress in high stress regions of seal plate 24, reducing strain and increasing stiffness in deflection regions of seal plate 24, and increasing energy absorption capacity at energy containment regions of seal plate 24. Reducing stress and strain in local regions of seal plate 24 can also reduce stress and strain in seal plate 24 generally. Reducing the stresses in high stress regions can reduce the failure rate of seal plate 24 and, thus, the failure rate of air cycle machine 10. Reduced failure rates result in reduced down time, reduced repairs, and reduced costs. Reducing the strain and increasing the stiffness in deflection regions can reduce the tolerances between rotors in air cycle machine 10 and surrounding components. Reducing the tolerances between the rotors and surrounding components can increase the compression efficiency of air cycle machine 10. Increased energy absorption capacity can improve the safe operation of air cycle machine 10. Should a rotor fail, seal plate 24 and other components in air cycle machine 10 can contain this energy to protect other components of air cycle machine 10.

Figure 4:
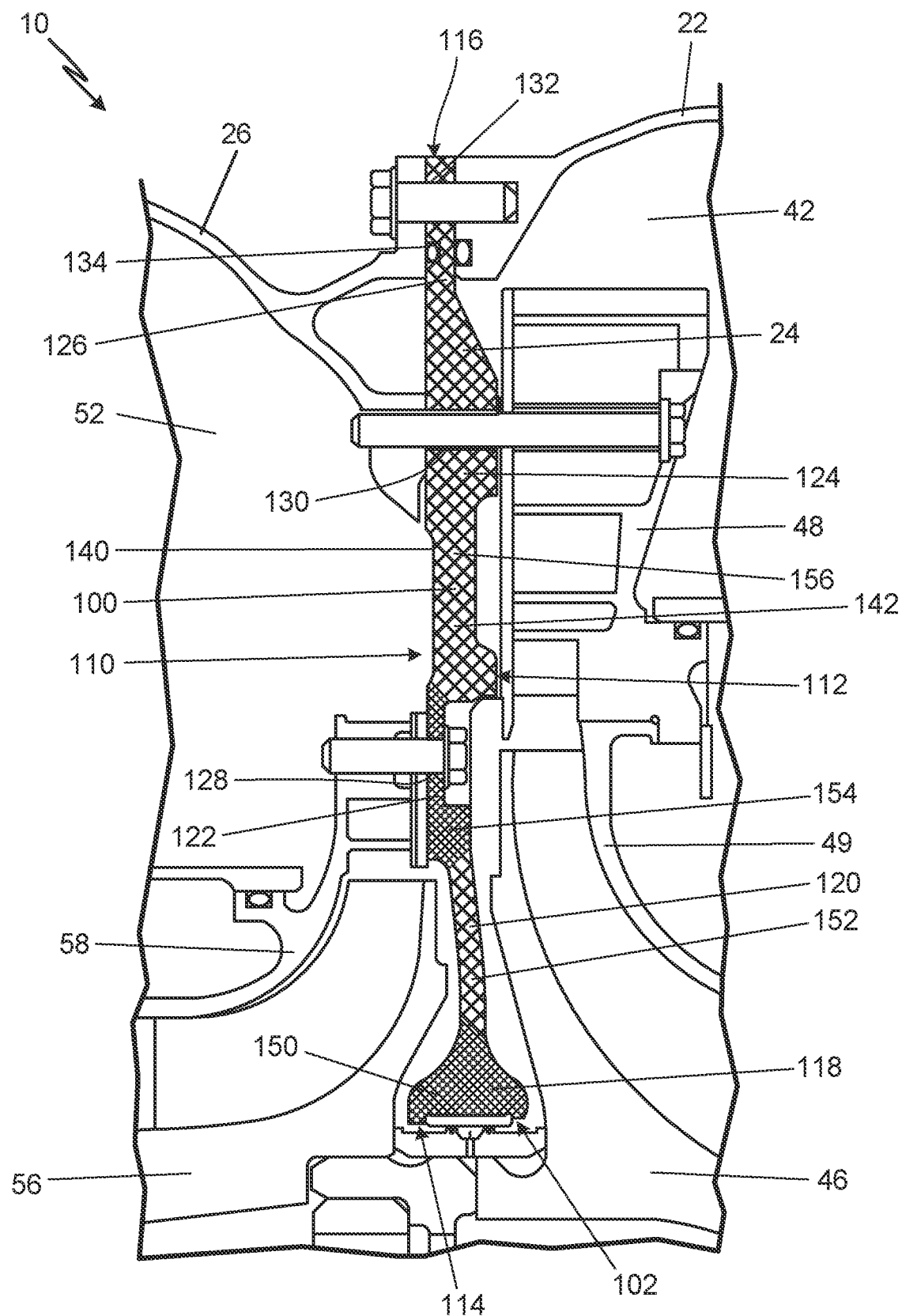
FIG. 4 is a cross-sectional view of the seal plate positioned in the air cycle machine.

FIG. 4 is a cross-sectional view of seal plate 24 positioned in air cycle machine 10. FIG. 4 shows fan and compressor housing 22, seal plate 24, first turbine housing 26, compressor duct 42, compressor rotor 46, diffuser 48, compressor rotor shroud 49, first turbine duct 52, first turbine rotor 56, first turbine rotor shroud 58. Seal plate 24 includes body 100 and bore 102. Body 100 includes first side 110, second side 112, radially inner end 114, radially outer end 116, hub 118, first disk portion 120, second disk portion 122, third disk portion 124, fourth disk portion 126, first plurality of holes 128, second plurality of holes 130, third plurality of holes 132, and groove 134. As shown in FIG. 4, body 100 further includes exterior surface 140 and lattice structure 142, which includes first region 150, second region 152, third region 154, and fourth region 156.

Air cycle machine 10 has the structure and design as described above in reference to FIG. 1. Seal plate 24 has the structure and design as described above in reference to FIGS. 2A-3. Hub 118 of seal plate 24 abuts a seal that interfaces with rotating components, including compressor rotor 46 and first turbine rotor 56 of air cycle machine 10. A first side of first disk portion 120 of seal plate 24 is positioned adjacent first turbine rotor 56, and a second side of first disk portion 120 of seal plate 24 is positioned adjacent compressor rotor 46. A first side of second disk portion 122 of seal plate 24 abuts first turbine rotor shroud 58. Bolts extend through first plurality of holes 128 in second disk portion 122 to bolt seal plate 24 to first turbine rotor shroud 58. A second side of second disk portion 122 of seal plate 24 is positioned adjacent to a radially outer end of compressor rotor 46. A first side of third disk portion 124 of seal plate 24 abuts a flange of first turbine housing 26, and a second side of third disk portion 124 of seal plate 24 abuts diffuser 48. Bolts extend through second plurality of holes 130 to bolt seal plate 24 between diffuser 48 and first turbine housing 26. Fourth disk portion 126 of seal plate 24 is positioned between fan and compressor housing 22 and first turbine housing 26. Bolts extends through third plurality of holes 132 to bolt seal plate 24 between fan and compressor housing 22 and first turbine housing 26.

Seal plate 24 has first region 150 of lattice structure 142 in hub 118. First region 150 is a deflection region of seal plate 24, which is a region of seal plate 24 that is subject to deflection. As compressor rotor 46 and first turbine rotor 56 rotate, first region 150 of hub 118 is subject to deflection. First region 150 of lattice structure 142 is an area of increased density that aids in deflection management of seal plate 24 to reduce and prevent deflection of seal plate 24. By reducing and preventing deflection of seal plate 24, the efficiency of air cycle machine 10 can be increased.

Seal plate 24 has third region 154 of lattice structure 142 in second disk portion 122 of seal plate 24. Third region 154 is a deflection region of seal plate 24, which is a region of seal plate 24 that is subject to deflection. As air cycle machine 10 operates, third region 154 of hub 118 is subject to deflection. Third region 154 of lattice structure 142 is an area of increased density that aids in deflection management of seal plate 24 to reduce and prevent deflection of seal plate 24. By reducing and preventing deflection of seal plate 24, the efficiency of air cycle machine 10 can be increased.

There are gaps between compressor rotor 46 and surrounding components, such as compressor rotor shroud 49, and between first turbine rotor 56 and surrounding components, such as first turbine rotor shroud 58, to prevent contact between compressor rotor 46 and first turbine rotor 56 and surrounding components. Contact between compressor rotor 46 and first turbine rotor 56 and surrounding components may damage the components and cause failure of air cycle machine 10. The gaps between compressor rotor 46 and first turbine rotor 56 and surrounding components have to account for deflections that compressor rotor 46 and first turbine rotor 56 and surrounding components, such as seal plate 24, can be subjected to during operation of compressor rotor 46 and first turbine rotor 56. Thus, the more deformation that compressor rotor 46, first turbine rotor 56, and seal plate 24 are subjected to during operation of compressor rotor 46 and first turbine rotor 56, the larger the gaps need to be to ensure component safety. However, air can leak from air cycle machine 10 through the gaps, which leads to inefficiencies in air cycle machine 10. Thus, it is desirable to minimize the gaps between compressor rotor 46 and first turbine rotor 56 and surrounding components. Identifying deflection regions of seal plate 24 and increasing the density of lattice structure 142 in the deflection regions (for example, first region 150 and third region 154) reduces and prevents the deflections and strain that seal plate 24 is subjected to during operation of compressor rotor 46 and first turbine rotor 56 by increasing the stiffness in these areas. This reduced deflection and strain and increased stiffness means that the parts deform less when in operation. If seal plate 24 undergoes less deflection, the gaps between compressor rotor 46 and first turbine rotor 56 and surrounding components can be reduced. Reducing the gaps increase the efficiency of air cycle machine 10.

Seal plate 24 has third region 154 of lattice structure 142 in second disk portion 122 of seal plate 24. Third region 154 is a stress region of seal plate 24, which is a region of seal plate 24 that is subject to high stress during operation of air cycle machine 10. The high stress in stress regions of seal plate 24, such as third region 154, is a higher stress than stresses present in other regions of seal plate 24. Third region 154 of lattice structure 142 is an area of increased density that aids in stress reduction during operation of air cycle machine 10 to reduce the stress in third region 154 of seal plate 24. Stress reduction at critical points of seal plate 24 leads to increased longevity of seal plate 24.

Reducing stress in stress regions of seal plate 24 will improve the longevity of seal plate 24. Reducing the stresses at stress regions can reduce the failure rate of seal plate 24, as well as the failure rate of air cycle machine 10 overall. During operation, these failures can damage components surrounding seal plate 24, as these components are required to contain the energy of the failure for safety of the aircraft and its passengers. Reduced failure rates result in reduced down time, reduced repairs, and reduced costs.

Seal plate 24 has third region 154 of lattice structure 142 in second disk portion 122 of seal plate 24. Third region 154 is an energy containment region of seal plate 24, which is a region of seal plate 24 that is designed to absorb energy. Third region 154 in second disk portion 122 is positioned adjacent to a radially outer end of compressor rotor 46 and needs to be designed to absorb energy from compressor rotor 46 in the event of a failure of compressor rotor 46. Third region 154 of lattice structure 142 is an area of increased density that aids in energy containment during operation of air cycle machine 10. Energy containment at critical points of seal plate 24 ensures safe operation of air cycle machine 10.

Increased energy containment is important to the safe operation of air cycle machine 10. If compressor rotor 46 fails, seal plate 24 is designed to absorb the energy to protect and prevent serious damage to other components of air cycle machine 10. Third region 154 of lattice structure 142 is positioned near compressor rotor 46 to contain the energy from compressor rotor 46 in seal plate 24.

Seal plate 24 is one example of a seal plate in which variable lattice structure 142 can be used. In alternate embodiments, variable lattice structure 142 can be used in any suitable seal plate having any design. Further, air cycle machine 10 is one example of a turbomachinery or rotary machine in which seal plate 24 or any other seal plate with variable lattice structure 142 can be used. In alternate embodiments, seal plate 24 or any other seal plate with variable lattice structure 142 can be used in any other rotary machine having a seal plate.

Figure 5:
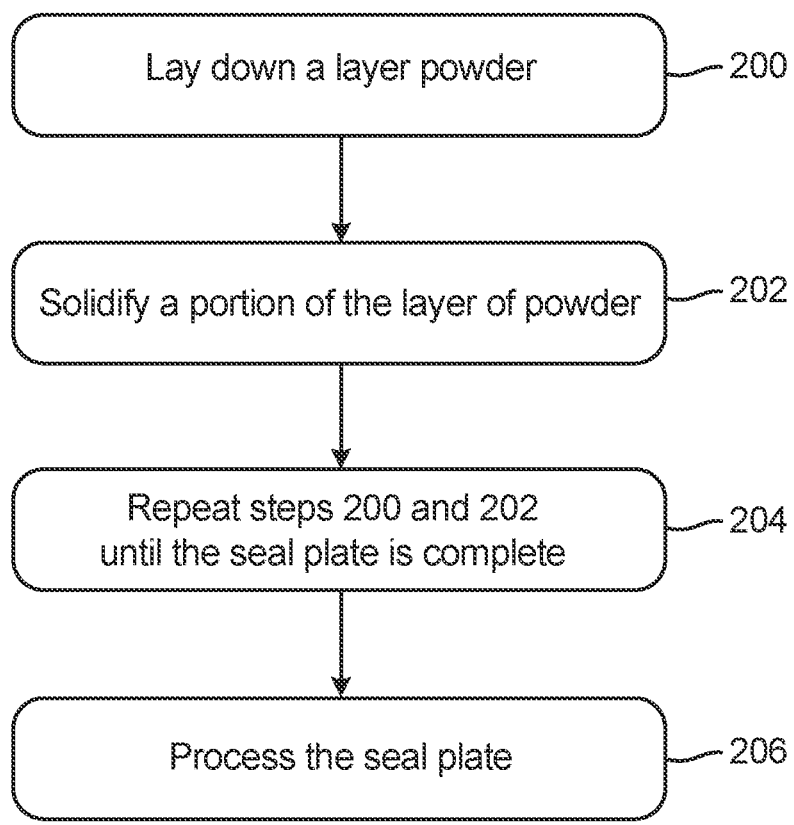
FIG. 5 is a flow chart showing a method of manufacturing the seal plate.

FIG. 5 is a flow chart showing a method of manufacturing seal plate 24. Step 200 includes laying down a layer of powder. Step 202 solidifying a portion of the layer of powder. Step 204 includes repeating steps 200 and 202 until seal plate 24 is completed. Step 206 includes processing seal plate 24.

Seal plate 24 can be manufactured using an additive manufacturing process. Additive manufacturing involves manufacturing seal plate 24 layer by layer. Additive manufacturing processes allow complex internal and external shapes and geometries to be manufactured that are not feasible or possible with traditional manufacturing. A typical additive manufacturing process involves using a computer to create a three-dimensional representation of seal plate 24. The three-dimensional representation will be converted into instructions which divide seal plate 24 into many individual layers. These instructions are then sent to an additive manufacturing device. This additive manufacturing device will print each layer, in order, and one at a time until all layers have been printed. Any additive manufacturing process can be used, including direct metal laser sintering, electron beam freeform fabrication, electron-beam melting, selective laser melting, selective laser sintering, or other equivalents that are known in the art.

Step 200 includes laying down a layer of powder. The powder can be made of a material selected from the group consisting of stainless steel, corrosion-resistant steel, nickel-chromium alloy, aluminum, titanium, synthetic fiber, fiberglass, composites, carbon fiber, thermosetting bismaleimide (BMI) resins, and combinations thereof. This powder may be laid down by a roller, pressurized gas, or other equivalents that are known in the art. This powder may have any grain size, wherein the grain size of the powder affects the unprocessed surface properties of seal plate 24.

Step 202 includes solidifying a portion of the layer of powder. A portion of the layer of powder can be solidified by applying energy to layer of powder. Any energy source can be used, including laser beam, electron beams, or other equivalents that are known in the art. The application of this energy will solidify the powder in a specific configuration. The specific configuration of solidified metal will be entirely dependent on which layer the process is currently at. This specific configuration will be in a specific shape and distribution so that when combined with the other layers, it forms seal plate 24.

Step 204 includes repeating steps 200 and 202 until seal plate 24 is completed. These two steps together lead to seal plate 24 being built layer by layer to completion. The specific configuration of step 202 consists of exterior surface 140, which is continuous and solid, and lattice structure 142, which has a varying density. The density of lattice structure 142 can be locally optimized to reduce stress or strain in specific regions and improve energy containment in specific regions. Reducing the stresses at high stress regions can reduce the failure rate of seal plate 24 and thus the failure rate of air cycle machine 10. Reduced failure rates result in reduced down time, reduced repairs, and reduced costs. Reduced strain, and thus reduced deflection, at deflection regions means that the parts deform less when in operation. If seal plate 24 undergoes less deflection, the tolerances between components of air cycle machine 10 can be reduced. Reducing tolerances between components increases the efficiency of air cycle machine 10. Improving energy containment in energy containment regions of seal plate 24 ensures the safe operation of air cycle machine 10.

Step 206 includes processing seal plate 24. Step 206 is an optional step. Processing seal plate 24 can include post processing steps, such as smoothing of exterior surface 140 of seal plate 24 or removal of powder from an interior of seal plate 24. Since an additive manufacturing process is used, exterior surface 140 of seal plate 24 may be rougher than desired. Through sanding, brushing, buffing, grinding, and combinations thereof, exterior surface 140 of seal plate 24 may be made smoother. Removal of the powder from an interior of seal plate 24 can involve the process of removing the unsolidified powder between lattice structure 142 through high pressure gas, mechanical movements, or other methods know in the art.

Discussion of Possible Embodiments

The following are non-exclusive descriptions of possible embodiments of the present invention.

A seal plate for a rotary machine includes a hub centered on a central axis of the rotary machine, a disk portion extending radially outwards from the hub, and a variable lattice structure in an interior of the seal plate. The variable lattice structure includes a first region of the seal plate having a first lattice structure, and a second region of the seal plate having a second lattice structure. The second lattice structure of the second region is denser than the first lattice structure of the first region. The second region is a deflection region, a stress region, or an energy containment region of the seal plate.

The seal plate of the preceding paragraph can optionally include, additionally and/or alternatively, any one or more of the following features, configurations and/or additional components:

The seal plate has a continuous exterior solid surface surrounding the variable lattice structure.

The stress region of the seal plate is a region of the seal plate that is subject to higher stress than other regions of the seal plate.

The stress region of the seal plate is a region surrounding a bolt hole in the disk portion of the seal plate.

The deflection region of the seal plate is a region of the seal plate that is subject to deflections.

The deflection region of the seal plate is a region surrounding a bolt hole in the disk portion of the seal plate.

The deflection region of the seal plate is the hub of the seal plate.

The energy containment region of the seal plate is a region of the seal plate that is configured to contain energy.

The energy containment region of the seal plate is a region surrounding a bolt hole in the disk portion of the seal plate.

The seal plate is made of a material selected from the group consisting of stainless steel, corrosion-resistant steel, nickel-chromium alloy, aluminum, titanium, synthetic fiber, fiberglass, composites, carbon fiber, thermosetting bismaleimide (BMI) resins, and combinations thereof.

A rotary machine includes a tie rod extending through the rotary machine along a central axis, a compressor rotor mounted on the tie rod, a turbine rotor mounted on the tie rod, a compressor housing surrounding the compressor rotor, and a turbine housing surrounding the turbine rotor. A seal plate is positioned between the compressor housing and the turbine housing. The seal plates includes a hub centered on the central axis of the rotary machine, a disk portion extending radially outwards from the hub, and a variable lattice structure in an interior of the seal plate. The variable lattice structure includes a first region of the seal plate having a first lattice structure, and a second region of the seal plate having a second lattice structure. The second lattice structure of the second region is denser than the first lattice structure of the first region. The second region is a deflection region, a stress region, or an energy containment region of the seal plate.

The rotary machine of the preceding paragraph can optionally include, additionally and/or alternatively, any one or more of the following features, configurations and/or additional components:

The seal plate has a continuous exterior solid surface surrounding the variable lattice structure.

The stress region of the seal plate is a region of the seal plate that is subject to higher stress than other regions of the seal plate.

The stress region of the seal plate is a region surrounding a bolt hole in the disk portion of the seal plate.

The deflection region of the seal plate is a region of the seal plate that is subject to deflections.

The deflection region of the seal plate is a region surrounding a bolt hole in the disk portion of the seal plate.

The deflection region of the seal plate is the hub of the seal plate that abuts rotating components mounted on the tie rod.

The energy containment region of the seal plate is a region of the seal plate that is configured to contain energy.

The energy containment region of the seal plate is a region surrounding a bolt hole in the disk portion of the seal plate.

The seal plate is made of a material selected from the group consisting of stainless steel, corrosion-resistant steel, nickel-chromium alloy, aluminum, titanium, synthetic fiber, fiberglass, composites, carbon fiber, thermosetting bismaleimide (BMI) resins, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal plate for a rotary machine, the seal plate comprising:
   a hub centered on a central axis of the rotary machine;
   a disk portion extending radially outwards from the hub; and
   a variable lattice structure in an interior of the seal plate, wherein the variable lattice structure comprises:
      a first plurality of holes in the disk portion;
      a second plurality of holes positioned radially outward from the first plurality of holes in the disk portion;
      a first region of the seal plate having a first lattice structure, wherein the first region of the seal plate is in the first disk portion; and
      a second region of the seal plate having a second lattice structure, wherein the second region of the seal plate is the hub of the seal plate;
      a third region of the seal plate having a third lattice structure;
      wherein the second lattice structure of the second region is denser than the first lattice structure of the first region, and the third lattice structure of the third region is denser than the first lattice structure of the first region;
      wherein the first region surrounds the second plurality of holes, and the third region surrounds the first plurality of holes; and
      wherein the second region is a deflection region and wherein the deflection region is a region of the seal plate subject to deflections.

2. The seal plate of claim 1, wherein the seal plate has a continuous exterior solid surface surrounding the variable lattice structure.

3. The seal plate of claim 1, wherein the second region of the variable lattice structure extends from the hub partially into the disk portion of the seal plate.

4. The seal plate of claim 1, wherein the seal plate is made of a material selected from the group consisting of stainless steel, corrosion-resistant steel, nickel-chromium alloy, aluminum, titanium, synthetic fiber, fiberglass, composites, carbon fiber, thermosetting bismaleimide (BMI) resins, and combinations thereof.

5. A rotary machine comprising:
   a tie rod extending through the rotary machine along a central axis;
   a compressor rotor mounted on the tie rod;
   a turbine rotor mounted on the tie rod;
   a compressor housing surrounding the compressor rotor;
   a turbine housing surrounding the turbine rotor; and
   a seal plate positioned between the compressor housing and the turbine housing,
   wherein the seal plate comprises:
      a hub centered on the central axis of the rotary machine;
      a disk portion extending radially outwards from the hub; and
      a variable lattice structure in an interior of the seal plate, wherein the variable lattice structure comprises:
         a first plurality of holes in the disk portion;
         a second plurality of holes positioned radially outward from the first plurality of holes in the disk portion;
         a first region of the seal plate having a first lattice structure, wherein the first region of the seal plate is in the first disk portion;

a second region of the seal plate having a second lattice structure, wherein the second region of the seal plate is the hub of the seal plate; and
  a third region of the seal plate having a third lattice structure;
 wherein the second lattice structure of the second region is denser than the first lattice structure of the first region, and the third lattice structure of the third region is denser than the first lattice structure of the first region;
 wherein the first region surrounds the second plurality of holes, and the third region surrounds the first plurality of holes; and
 wherein the second region is a deflection region and wherein the deflection region is a region of the seal plate subject to deflections.

6. The rotary machine of claim 5, wherein the seal plate has a continuous exterior solid surface surrounding the variable lattice structure.

7. The rotary machine of claim 5, wherein the second region of the variable lattice structure extends from the hub partially into the disk portion of the seal plate.

8. The rotary machine of claim 5, wherein the seal plate is made of a material selected from the group consisting of stainless steel, corrosion-resistant steel, nickel-chromium alloy, aluminum, titanium, synthetic fiber, fiberglass, composites, carbon fiber, thermosetting bismaleimide (BMI) resins, and combinations thereof.

* * * * *